(12) United States Patent
Maleck

(10) Patent No.: US 9,707,604 B2
(45) Date of Patent: *Jul. 18, 2017

(54) SOIL REMEDIATION UNIT

(71) Applicant: Tom Lee Maleck, Galesburg, IL (US)

(72) Inventor: Tom Lee Maleck, Galesburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/997,109

(22) Filed: Jan. 15, 2016

(65) Prior Publication Data

US 2016/0129488 A1 May 12, 2016

Related U.S. Application Data

(63) Continuation of application No. 14/542,882, filed on Nov. 17, 2014, now Pat. No. 9,267,684.

(60) Provisional application No. 61/914,487, filed on Dec. 11, 2013.

(51) Int. Cl.
| | |
|---|---|
| *B09C 1/06* | (2006.01) |
| *B09B 3/00* | (2006.01) |
| *F23G 7/14* | (2006.01) |
| *F23G 5/40* | (2006.01) |
| *F23G 5/12* | (2006.01) |
| *F23C 5/08* | (2006.01) |

(52) U.S. Cl.
CPC ............ *B09C 1/06* (2013.01); *F23C 5/08* (2013.01); *F23G 5/12* (2013.01); *F23G 7/14* (2013.01); *B09B 3/0083* (2013.01); *F23G 5/40* (2013.01); *F23G 2203/8013* (2013.01); *F23G 2204/103* (2013.01)

(58) Field of Classification Search
CPC . F23G 5/40; F23G 7/14; B09B 3/0083; B09C 1/06
See application file for complete search history.

(56) References Cited

U.S. PATENT DOCUMENTS

| | | |
|---|---|---|
| 2,608,943 A | 9/1959 | Weggel |
| 3,635,646 A | 1/1972 | Cox |
| 3,808,985 A | 5/1974 | Raber |
| 3,985,085 A | 10/1976 | Schroder |
| 4,144,824 A | 3/1979 | Bartling, Sr. |
| 4,462,793 A | 7/1984 | Maeda et al. |
| 4,748,921 A | 6/1988 | Mendenhall |
| 4,913,586 A | 4/1990 | Gabbita |

(Continued)

FOREIGN PATENT DOCUMENTS

| | | | |
|---|---|---|---|
| DE | 3924076 | 11/1990 | |
| DE | 3924076 C1 * | 11/1990 | ............ F23G 5/004 |
| GB | 191101872 | 0/1912 | |

OTHER PUBLICATIONS

Environmental Engineering and Management Journal, Nov.-Dec. 2008, vol. 7, No. 6.

*Primary Examiner* — Frederick L Lagman
(74) *Attorney, Agent, or Firm* — Vedder Price P.C.

(57) ABSTRACT

A soil remediation unit that changes the use and purpose of certain commercially available aggregate mixing devices and or pug mills for removing unwanted contaminants from a quantity of contaminated soil aggregate or substrate which includes a canopy and a burner tube attached to the canopy. The burner tube includes an upper securing element and a lower adjustment element. The soil remediation unit also includes a burner supported in a desired position within the burner tube by the upper securing element and the lower adjustment element.

19 Claims, 10 Drawing Sheets

(56) References Cited

U.S. PATENT DOCUMENTS

| | | |
|---|---|---|
| 4,957,429 A | 9/1990 | Mendenhall |
| 4,974,528 A | 12/1990 | Barcell |
| 5,020,452 A | 6/1991 | Rybak |
| 5,027,721 A | 7/1991 | Anderson |
| 5,086,717 A | 2/1992 | McCrossan |
| 5,121,699 A | 6/1992 | Frank |
| 5,161,326 A | 11/1992 | Weirich et al. |
| 5,252,124 A | 10/1993 | Brashears |
| 5,393,501 A | 2/1995 | Clawson et al. |
| 6,464,430 B1 | 10/2002 | Maleck |
| 6,929,696 B2 * | 8/2005 | Arvin .................... B05B 7/162 118/300 |
| 7,975,851 B2 | 7/2011 | Kossowan et al. |
| 8,348,551 B2 | 1/2013 | Baker et al. |
| 9,267,684 B2 * | 2/2016 | Maleck .................... B09C 1/06 |

* cited by examiner

SOIL REMEDIATION UNIT

This application is a continuation application, claiming priority to non-provisional U.S. patent application Ser. No. 14/542,882 filed on Nov. 17, 2014 and issued on Feb. 23, 2016 as U.S. Pat. No. 9,267,684 which is based on and claims priority to provisional U.S. Patent Application No. 61/914,487 filed Dec. 11, 2013, the contents of which are hereby incorporated by reference.

BACKGROUND

Construction projects and work sites are often faced with issues when the soil in a work site has become contaminated with various materials. Contaminated soil may require remediation in order to remove the contaminants that may have accumulated in the soil over time. Contaminants are often found in the soil associated with industrial sites, sites related to the petroleum industry (e.g., refineries, processing facilities, and gas stations) and transportation sites (e.g., airports, rail yards, pipelines, etc.).

One method of decontaminating the soil in such sites includes the heating of the soil to sufficient temperature so as to burn off the various contaminants that have accumulated in the soil. One known method of performing this decontamination is by transporting the soil to a large industrial oven and heating the soil to the necessary temperature and then returning the soil to the site. This method is faced with many disadvantages including the cost of transporting the contaminated soil to the heating facility as well as the environmental issues associated with operating an industrial furnace.

A second method of decontamination includes heating the contaminated soil at the work site. U.S. Pat. No. 6,464,430, the contents of which are hereby incorporated by reference, includes an example of heating contaminated soil in a mobile decontamination apparatus at a work site. Known apparatus, however, include several disadvantages including efficiency, durability, and performance problems.

Therefore, there exists a need for an improved device that can efficiently, cost-effectively, and reliably remove contaminants from soil.

BRIEF SUMMARY

In one embodiment, a soil remediation unit for removing contaminants from a quantity of contaminated soil includes a canopy, a burner tube attached to the canopy with a height adjustment element. The soil remediation unit also includes a burner supported in a desired position by the height adjustable elements.

In another embodiment, the soil remediation unit additionally includes at least one vapor exhaust mechanism that includes a hatch and a port. The hatch is connected to the canopy of the soil remediation and is configured to operate in an open position and a closed position such that when the hatch is in an open position, excess vapor is permitted to exit the soil remediation unit.

In another embodiment, the canopy of the soil remediation unit includes a first panel, a second panel and a bar. The first panel and the second panel are joined together with a hinge at one edge. The bar fixes the first panel and the second panel at a desired angle relative to one another.

In still another embodiment, the soil remediation unit is configured to be attached to a pug mill through which contaminated soil is conveyed. A dirt dam can be connected to the pug mill with a notch having a predetermined height. The predetermined height of the dirt dam maintains a desired depth of soil in the pug mill and facilitates the removal of contaminants as the soil travels through the pug mill and beneath the soil remediation unit.

The soil remediation unit may include a burner assembly. In one example, the burner assembly includes a burner tube with an upper securing element, a lower adjustment element and an intake opening. The burner assembly also includes a burner that is secured to the burner tube by the upper securing element and the lower adjustment element.

In another example burner assembly, the burner assembly includes a spacer connected to the lower adjustment element and positioned between the outer surface of the burner and the inside surface of the burner tube to maintain an air gap inside the burner tube.

In another example burner assembly, the burner tube includes sets of lower adjustment holes. The first and second sets of lower adjustment holes in the burner tube can be positioned at different vertical heights to permit the positioning of the burner at different heights.

In still another example burner assembly, the burner includes an annular bottom surface that rests on the lower adjustment element when assembled into the burner tube. This configuration prevents the burner from falling through the burner tube and assists in maintaining the burner's position inside the burner tube.

As discussed above, the soil remediation unit can be used to remove contaminants from soil and other uses. In one example method of use, a soil remediation unit is connected to a pug mill wherein the soil remediation unit includes a canopy and a burner tube connected to the canopy. The method may also include the step of securing a burner inside the burner tube at a desired location relative to the canopy. The method may also include moving soil through the pug mill and under the soil remediation unit such that the soil is heated by the burners to remove unwanted contaminants from the soil.

In another example, the step of securing a burner inside the burner tube requires only one of three upper securing elements to be moved relative to the burner tube.

In still another example, the step of securing a burner includes resting the bottom edge of the burner on the adjustment element and moving the securing element radially inward to contact the outer surface of the burner.

BRIEF DESCRIPTION OF THE SEVERAL VIEWS OF THE DRAWING

Certain embodiments are shown in the drawings. However, it is understood that the present disclosure is not limited to the arrangements and instrumentality shown in the attached drawings, wherein.

DETAILED DESCRIPTION

Figure 1:
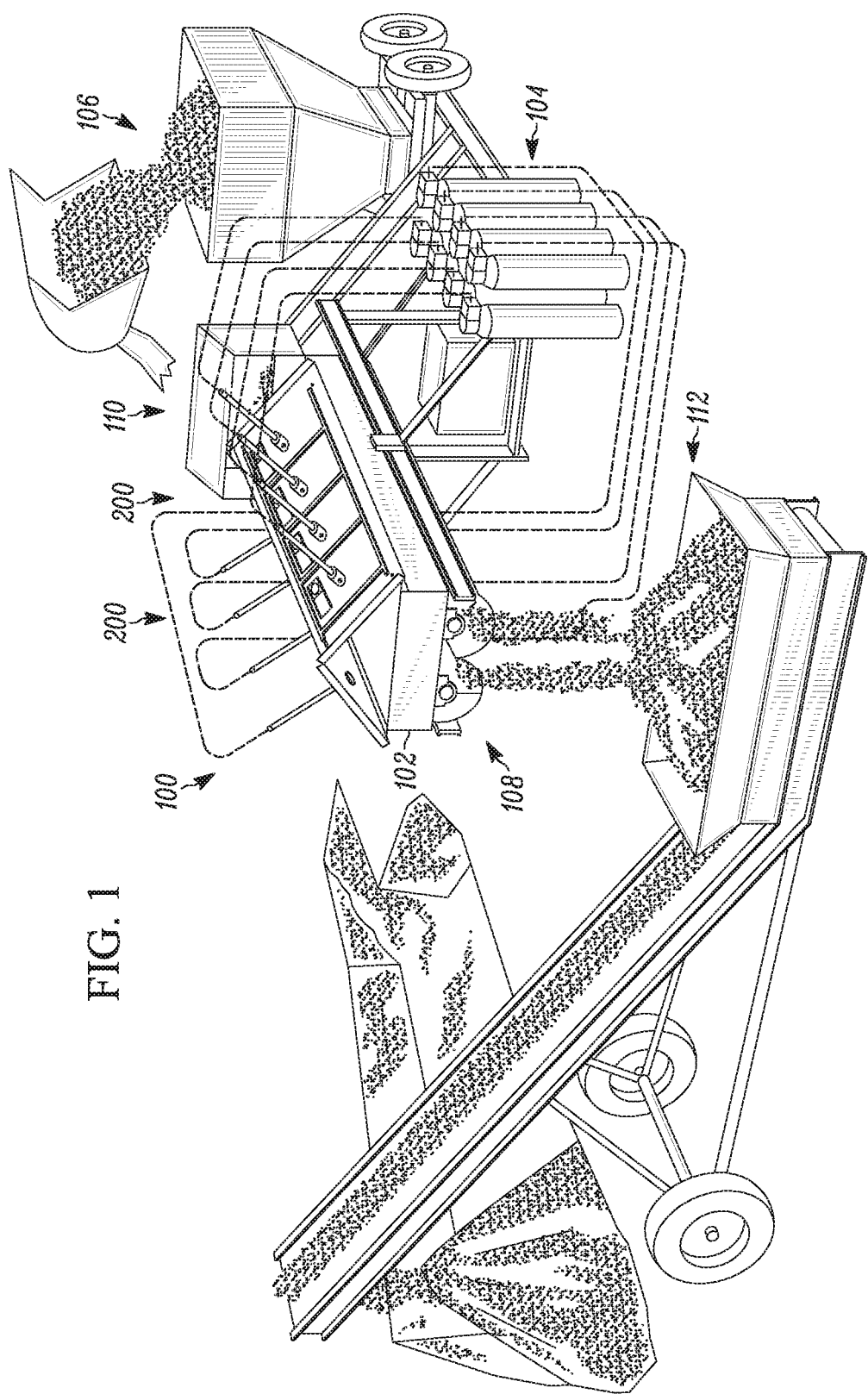
FIG. 1 is an illustration of one embodiment of a soil remediation unit at a work site in accordance with the present disclosure.

For the purposes of promoting and understanding the principles disclosed herein, references are now made to the preferred embodiments illustrated in the drawings and specific language is used to describe the same. It is nevertheless understood that no limitation of the scope of the invention is thereby intended. Such alterations and further modifications in the illustrated device and such further applications of the principles disclosed as illustrated herein are contemplated as would normally occur to one skilled in the art to which this disclosure relates.

FIG. 1 shows one embodiment of soil remediation unit 100. As shown in use on a job site, soil remediation unit 100 is connected to or is positioned over pug mill 102. Pug mill 102 can be any suitable device that moves soil 106 from an intake to an outlet 108. As will be discussed in more detail below, burners 200 positioned along soil remediation unit 100 heat contaminated soil 106 to sufficient temperatures such that contaminants in contaminated soil 106 are burned off to result in decontaminated soil exiting the pug mill 102 at outlet 108. In one embodiment, burners 200 are connected to a fuel source 104 to produce the raised temperatures in soil remediation unit 100. In this embodiment, each burner is connected to an individual quantity of fuel. However, in other embodiments, burners 200 can be connected to a single manifold that, in turn, is connected to a single source of fuel. In this embodiment, a single drum, tank, or other volume of fuel can be used instead of individual tanks serving each burner. In the embodiment shown, fuel source 104 is propane. Other types of fuel can also be used so long as the necessary temperatures can be reached to remove the contaminants from the soil. For example, natural gas and other types of liquefied petroleum gas may also be used.

Figure 2:
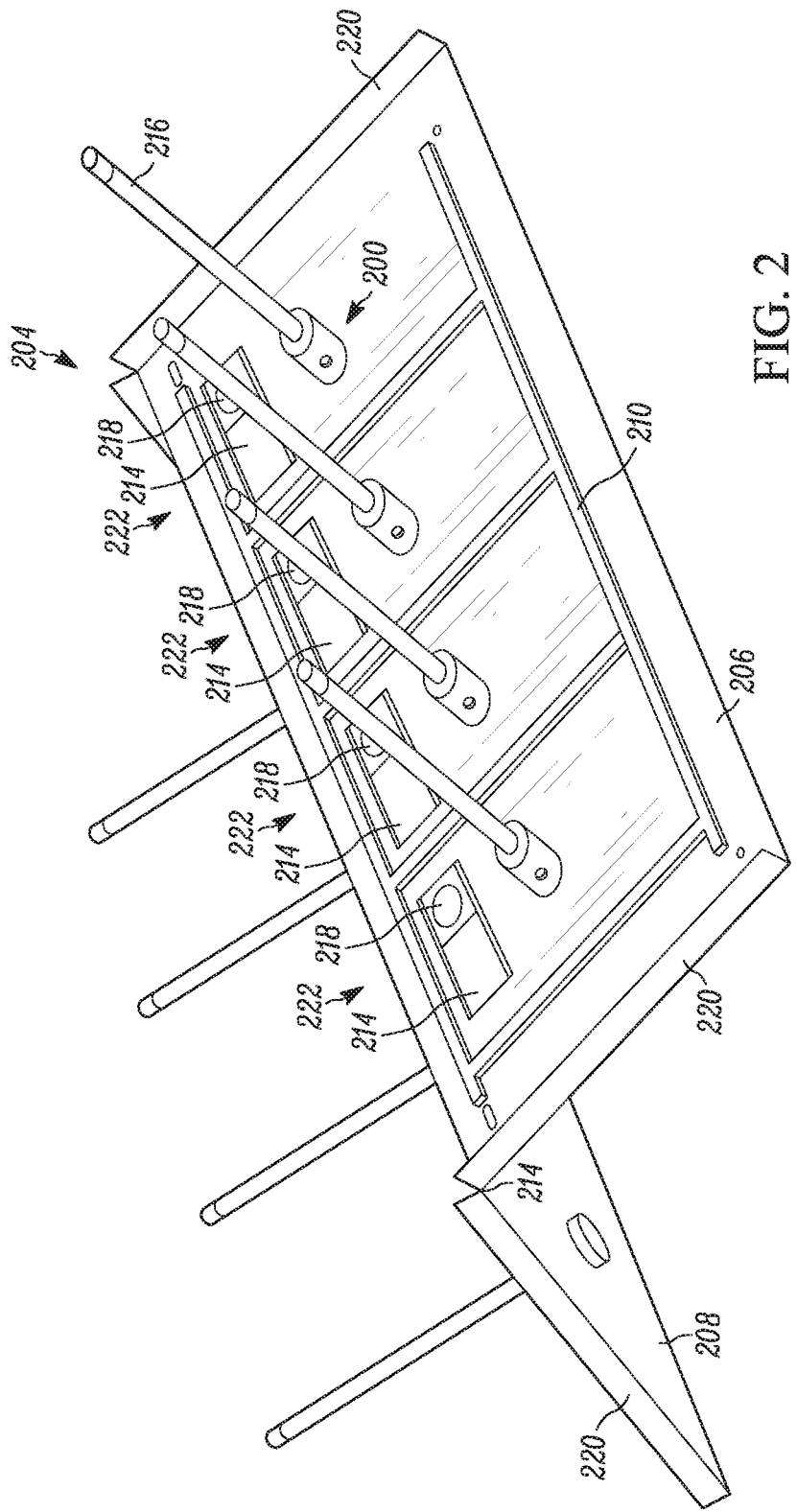
FIG. 2 is an illustration of the embodiment of the soil remediation unit of FIG. 1.

FIG. 2 shows, in further detail, soil remediation unit 100. Soil remediation unit 100 may include burner 200, burner tube 202, canopy 204 and vapor exhaust mechanism 222. Canopy 204, in this embodiment, is the central support element of soil remediation unit 100. Canopy 204 is the member of soil remediation unit 100 that secures the various other elements in position relative to pug mill 102. In addition, canopy 204 can serve to enclose an area around the contaminated soil such that sufficient temperatures can be reached to decontaminate the soil. In this embodiment canopy 204 includes first panel 206 and second panel 208 attached together via hinge 212 that joins the upper edges of first panel 206 and second panel 208. This type of construction of canopy 204 allows first panel 206 and second panel 208 to move relative to each other along hinge 212 such that soil remediation unit 100 can be adjusted to fit pug mills of varying shapes and sizes. Canopy 204 can be made of various types of materials. In one embodiment, canopy 204 is made of 12 gauge sheet steel but other sizes and types of material can also be used.

Figure 3:
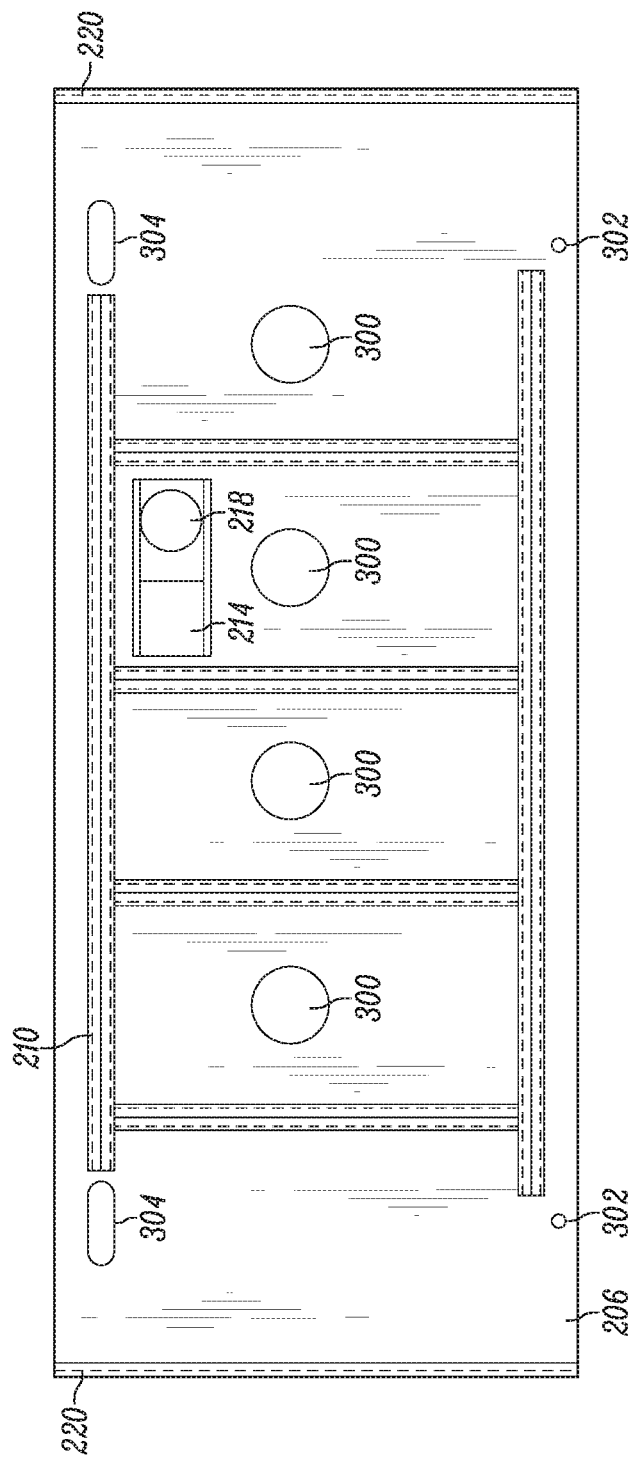
FIG. 3 is a plan view of one panel of another embodiment of a soil remediation unit in accordance with the present disclosure.

Canopy 204 may also include reinforcement elements 210. Reinforcement elements 210 are members connected to first panel 206 and second panel 208 to provide rigidity to the panels. Reinforcement elements 210 may be positioned in various configurations so long as they provide the rigidity necessary to manipulate canopy 204 as needed and to support the various other elements of soil remediation unit 100. In one embodiment, as shown in FIGS. 2 and 3, reinforcement elements 210 are positioned in a ladder configuration with two elements aligned along the top and bottom of first panel 206 with one or more elements connecting the top and bottom elements. Reinforcement elements 210 can be symmetrically positioned on second panel 208 to provide similar rigidity to second panel 208. Other configurations of reinforcement elements can also be used.

Figure 10:
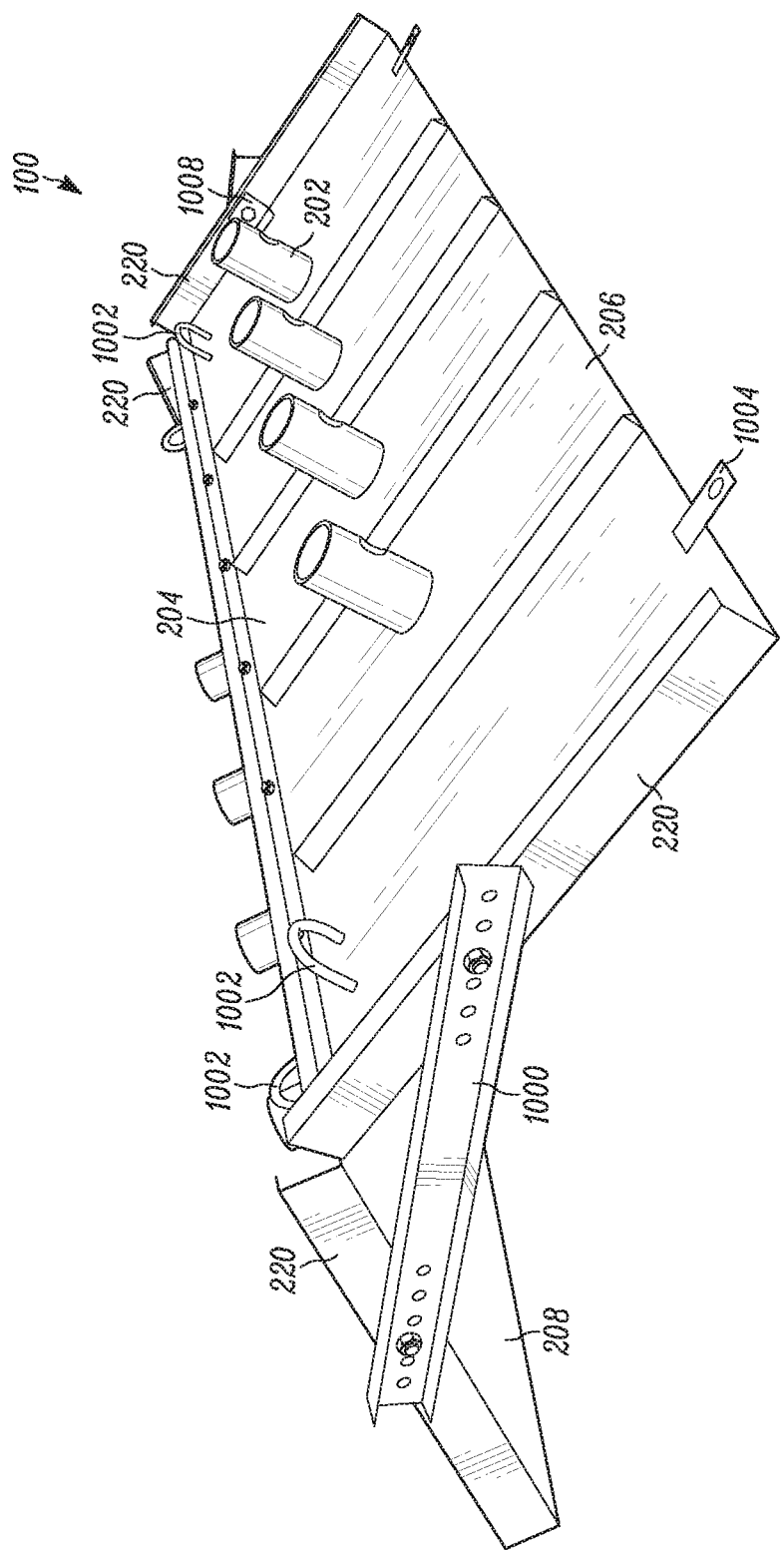
FIG. 10 is an illustration of another embodiment of a soil remediation device in accordance with the present disclosure.

In another embodiment of canopy 204, as shown in FIG. 10, reinforcement elements may include one or more elements positioned at predetermined intervals along first panel 206 that extend from a bottom edge of first panel 206 to an upper edge of first panel 206. Reinforcement elements 210, in this embodiment, may be lengths of right-angle brackets wherein the legs of the right-angle bracket are secured to an outer surface of first panel 206 by welding or other methods of attachment known to one of ordinary skill in the art. In this configuration, reinforcement elements 210 create triangular-shaped channels with the outer surface of first panel 206. In other embodiments, other shapes of reinforcement elements can be used. Rectangular, arched, hollow and solid shapes can also be used as reinforcement elements on canopy 204.

As shown on FIG. 10, canopy 204 may also include bar 1000, one or more loops 1002, one or more tabs 2004 and flange 220. Flange 220 is a feature of canopy 204 that provides further rigidity to first panel 206 and second panel 208. Flange 220, in this embodiment, is a portion of first panel 206 or second panel 208 formed at a right angle to the outer surface of first panel 206 or second panel 208 or into a C or U-shape. Flange 220, however, can be a separate piece of material welded or otherwise joined to canopy 204 by means known to one of ordinary skill in art. In the embodiment shown in FIG. 10, flange 220 also includes a fastening element to which bar 1000 is connected. In this embodiment, bar 1000 is connected to flange 220 on first panel 206 as well as to flange 220 on second panel 208. As can be appreciated, the angle of canopy 204 can be varied by moving first panel 206 relative to second panel 208 and securing each panel relative to one another by bar 1000. In this manner, canopy 204 can be varied to operate in conjunction with pug mills of varying widths and sizes. To assist in this regard, bar 1000 includes a series of adjustment holes 1006. Canopy 204 is secured into a desired alignment by connecting bar 1000 to canopy 204 by inserting a bolt or other fastener through an adjustment hole on bar 1000 and through an attachment hole on each flange 220 located on first panel 206 and second panel 208. Canopy 204 can further include a rigidity element 1008. As shown on FIG. 10, rigidity element 1008 can be a steel L-shaped bracket that further reinforces the connection of bar 1000 to flange 220. Other configurations and materials of rigidity element 1008 can also be used. Canopy 204 can also be similarly equipped with a second bar 1000 located at the opposite end of canopy 204. In this embodiment, bar 1000 is a u-shaped steel channel, however, other shapes and materials can be used as well.

Referring back to FIG. 10, canopy 204 may also include one or more loops 1002. In this embodiment loop 1002 is a u-shaped member with either end attached to first panel 206. Loop 1002 can be welded or otherwise attached to first panel 206. Loop 1002 can also be configured in other shapes so long as the shape facilitates the attachment of hooks, cables, ropes, chains or other means that may be used to lift or move canopy 204 during transport, set-up, or take-down. Loops 1002 can be located at various locations on first panel 206 and can also be positioned on second panel 208.

Canopy 204 may also include one or more tabs 1004. Tabs 1004 may be a rectangular piece of steel with a hole in one end as shown in FIG. 10. Other configurations and materials may also be used. Tab 1004 extends outward from first panel 206 of canopy 204 for fixing canopy 204 relative to a pug mill. To this end, two tabs 1004 may be positioned on the lower edges of first panel 206 or second panel 208. In other embodiments, first panel 204 or second panel 208 are of sufficient length such that tab 1004 is not needed for attachment to a pug mill. In these embodiments, first panel 206 or second panel 208 is provided with a hole through the panel. These holes can be similarly used for fixing canopy 204 to a pug mill.

As shown in FIGS. 2 and 3, soil remediation unit 100 may also include vapor exhaust mechanism 222. Vapor exhaust mechanism is the element of soil remediation unit 100 that can allow gases, such as steam, to escape from the area located under canopy 204. As can be appreciated, when extremely moist soil, aggregates, or mud is heated in soil remediation unit 100, the water or other liquids mixed with the soil may be changed into a vapor or gas form. This vapor can build up under canopy 204 and can saturate the mixture of gas located in the region near burners 200 such that the burners may not perform efficiently. This reduced efficiency can be remedied by releasing surplus trapped steam or vapor from under canopy 204 through vapor exhaust mechanism 222.

In one embodiment, vapor exhaust mechanism 222 may include hatch 214 and port 218. Port 218 is an opening in canopy 204 that allows gas or vapor to escape from the area beneath canopy 204. Port 218 can be any feature of canopy 204 so long as it allows gas or vapor to flow from the area under canopy 204 to the area above canopy 204. Port 218 can be a hole, a slot, a membrane, or a series of holes or slots or other suitable features. Hatch 214, in this embodiment, is a rectangular piece of metal that can slide in grooves or retention members. Hatch 214 can be in an open position, as shown in FIG. 2, that allows vapor to escape through port 218. Hatch 214 can also be moved to the normal closed position by sliding hatch 214 in the grooves or retention members such that port 218 is covered by hatch 214 and gas or vapor is prevented from escaping through port 218. In other embodiments, hatch 214 can be configured in other shapes and materials known to one of ordinary skill in the art. In addition, hatch 214 may be connected to canopy 204 with a hinge, pivot pin, or other member that allows hatch 214 to move from an open position in which vapor can escape through port 218 to a closed position in which vapor is limited from escaping through port 218.

Figure 6:
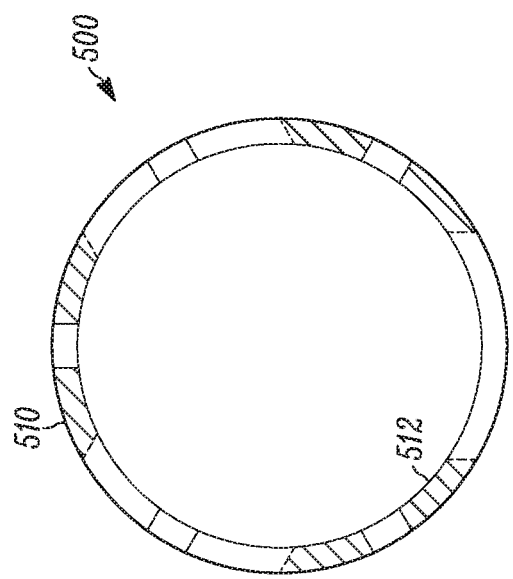
FIG. 6 is a top view of the embodiment of the burner tube of FIG. 4.
Figure 7:
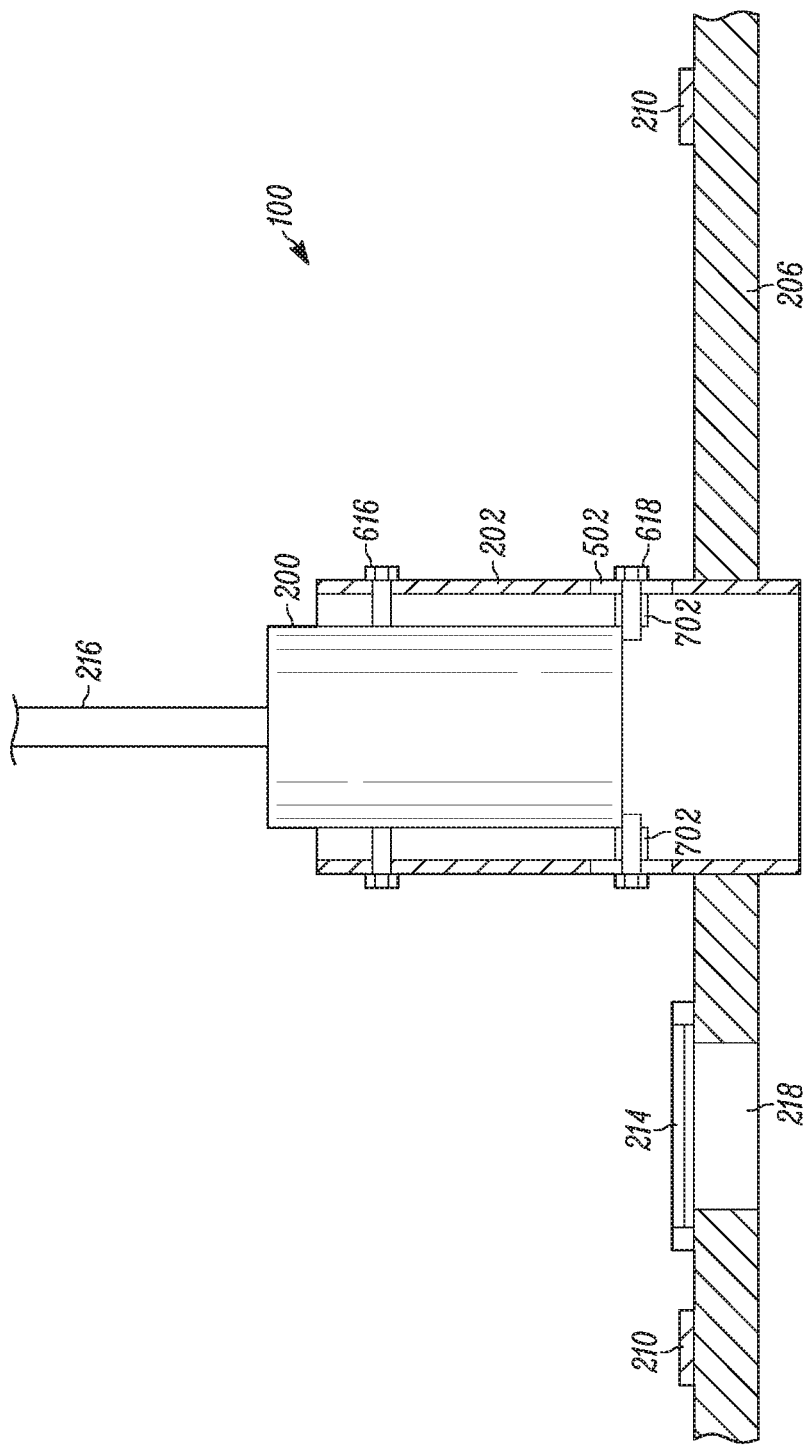
FIG. 7 is a sectional view of a panel of another embodiment of the soil remediation unit in accordance with the present disclosure.

As shown in FIGS. 2-8, soil remediation unit 100 may also include burners 200 and burner tubes 202. Burners 200, in one embodiment, are cylindrical in shape. At an upper end of burner 200, riser 216 is attached. Riser 216, in one embodiment, is a length of pipe that is attached to burner 200 at one end and attached to fuel source 104 at the other. In this configuration, riser 216 conveys fuel to burner 200. Burner 200 may also include a nozzle, orifice or other features known to one of ordinary skill in the art through which fuel is expelled and combusts resulting in a heat source for the heating of contaminated soil. As shown in FIG. 7, an outer surface of burner 200 is configured such that it fits within burner tube 202. In other embodiments, burner 200 can be configured in different shapes and different materials so long as the burner introduces sufficient quantities of heat to soil remediation unit 100 to effectively decontaminate soil.

Soil remediation unit may also include burner tube 202. Burner tube 202, in one embodiment, is the element of soil remediation unit 100 that allows for the adjustment and positioning of burner 200 as well as facilitating an efficient operation of burner 200 and prolonging the life of burner 200. Burner tube 202, in this embodiment, is cylindrical in shape with an inner and outer surface through which various openings extend therethrough. As stated above, the inner surface of burner tube 202 defines a volume in which burner 200 can be positioned and adjusted. In one embodiment, burner tube 202 is a steel cylindrical tube with an inner diameter of 4 inches, an outer diameter of 4.5 inches and a height of 6.75 inches. Other sizes, however, can be used.

Figure 4:
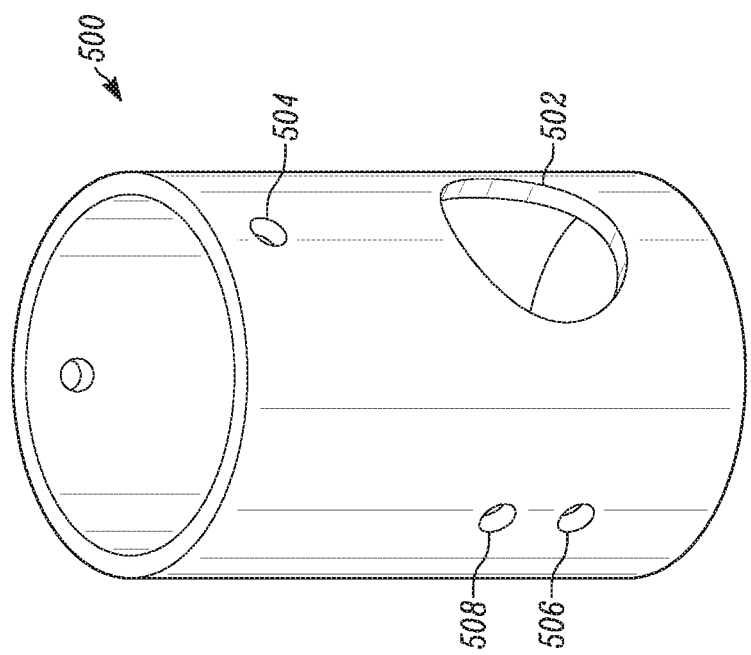
FIG. 4 is an illustration of an embodiment of a burner tube in accordance with the present disclosure.

As stated above, Burner tube 202 allows burner 200 to be positioned and adjusted. To this end, burner tube 202 may include one or more upper securing holes 504 and one or more lower adjustment holes 506, 508. Upper securing and lower adjustment holes can be threaded or smooth bore holes. Upper securing and lower adjustment elements 616, 618 can be inserted through the upper securing and lower adjustment holes to position and adjust burner 200 within burner tube 202. The upper securing and lower adjustment elements 616, 618 can be threaded fasteners, pins, rods or other suitable retention members. In one embodiment, burner tube 202 includes a series of upper securing holes evenly distributed around the circumference of burner tube 202 approximately 0.75 inches under an upper edge of burner tube 202. In this embodiment, three upper securing holes are positioned at 120 degrees from each other around burner tube 202. Burner tube 202, as shown in FIG. 4, can also include a series of first lower adjustment holes 506 and a series of second lower adjustment holes 508. In one embodiment, the series of first lower adjustment holes 506 and series of second lower adjustment holes 508 are located approximately 1.75 and 2.625 inches above a lower edge of burner tube 202. The series of first and second lower adjustment holes can be distributed evenly around the circumference of burner tube 202. In one embodiment, the series of first and second lower adjustment holes 506, 508 can include three holes in each series positioned at 120 degree intervals around burner tube 202. The series of lower adjustment holes can be staggered with respect to upper securing holes 504 such that burner 200 is more firmly supported when securing element 616, and adjusting element 618 located in the series of adjustment holes contact burner 200. In one embodiment, upper securing holes are positioned at 120 degree intervals equally spaced around burner tube 202. The lower adjustment holes, in this embodiment, are positioned out of phase with the upper securing holes to distribute the retention of burner around its circumference. In one embodiment, the upper securing and lower adjustment holes are out of phase with each other by 60 degrees. In other embodiments, other configurations of upper securing and lower adjustment holes 504, 506, 508 can be used including more or less holes and different distributions of the holes around burner tube 202.

As shown in FIG. 7 and described above, the series of upper securing and lower adjustment holes 504, 506, 508 may be threaded or non-threaded. In one embodiment, the upper securing holes 504 are threaded and upper securing elements 616 are threaded fasteners that are inserted into the adjustment holes and secured in position. In other embodiments, the adjustment holes are non-threaded. In one such example, adjustment element 616, 618 may be a bolt and nut or a pin that is inserted into an adjustment hole and secured in position. One such example is shown in FIG. 7 where lower adjustment hole 506, 508 is non-threaded and lower adjustment element 618 is a bolt whereby, after being inserted through lower adjustment hole 506, 508, the lower adjustment element 618 is secured in position via spacer 702. The adjustment and securing elements can be arranged such that the fasteners or pins radially converge and hold burner 200 in position.

In another embodiment, two of the three securing elements that are positioned in upper securing holes 504 are stationary and the third securing element can be secured against burner 200 to secure burner in position. In this manner, the stationary upper securing elements maintain an equal air gap and burner 200 can be centered within burner tube 202. Additionally, only one securing element (i.e., the third non-stationary upper securing element) needs to be manipulated to secure or release burner 200. Tether 802, further explained below, can be connected to this third non-stationary upper securing element.

In other embodiments and as shown in FIG. 7, the adjustment elements located in the lower adjustment holes are configured such that the adjustment element extends into burner tube 202 so that the lower edge of burner 200, when inserted into burner tube 202, sits on the adjustment element. In this embodiment, spacer 702 can be included on an adjustment element to assist in maintaining an equal air gap between the inner surface of burner tube 202 and burner 200. Spacer 702 can be any suitable sleeve of material that can be placed over the adjustment element to maintain the air gap. In one embodiment, spacer 702 is a nut secured onto a bolt and burner 200 sits on the exposed length of the bolt after the nut secures the bolt in position in the lower adjustment hole. As can be appreciated, in such a configuration, the vibration or movement of soil remediation unit 100 is less likely to loosen the adjustment element and the likelihood of burner 200 moving or falling out of position is reduced.

Figure 5:
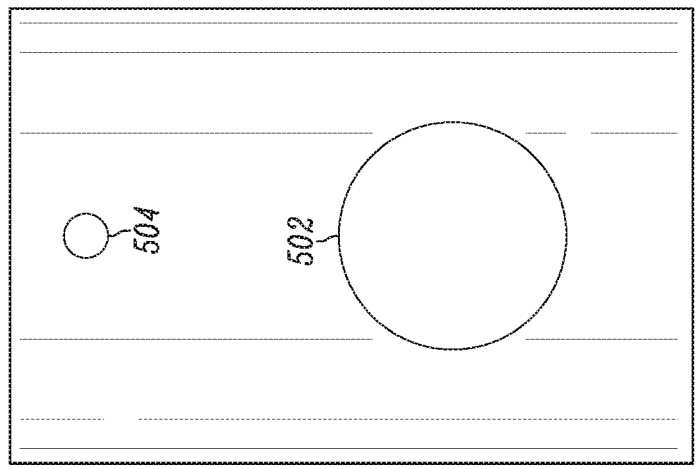
FIG. 5. is a side view of the embodiment of the burner tube of FIG. 4.

Further shown in FIGS. 4-6, burner tube 202 includes intake opening 502. Intake opening 502 permits ambient air to enter burner tube 202 and interact with burner 200. The flow of air into burner tube 202 permits efficient combustion of fuel that exits burner 200. In one embodiment, intake opening 502 is a 2.25 inch diameter opening but other sizes and shapes can be used as well. Further shown in this embodiment, particularly in FIG. 7, intake opening 202 can be positioned to reside just above the first or second panel 206, 208 of canopy 204. This arrangement permits the flow of air from above soil remediation unit 100 into burner tube 202. Intake opening 502 can be a series of openings of equal or varying sizes positioned around the circumference of burner tube 202. In one example, three 2.25 inch diameter holes are positioned around the circumference of burner tube 202 at 120 degrees from each other such that they are evenly distributed. In other examples, different configurations of intake openings can be used such as, two intake openings positioned opposite one another or an increased number of smaller holes.

Figure 8:
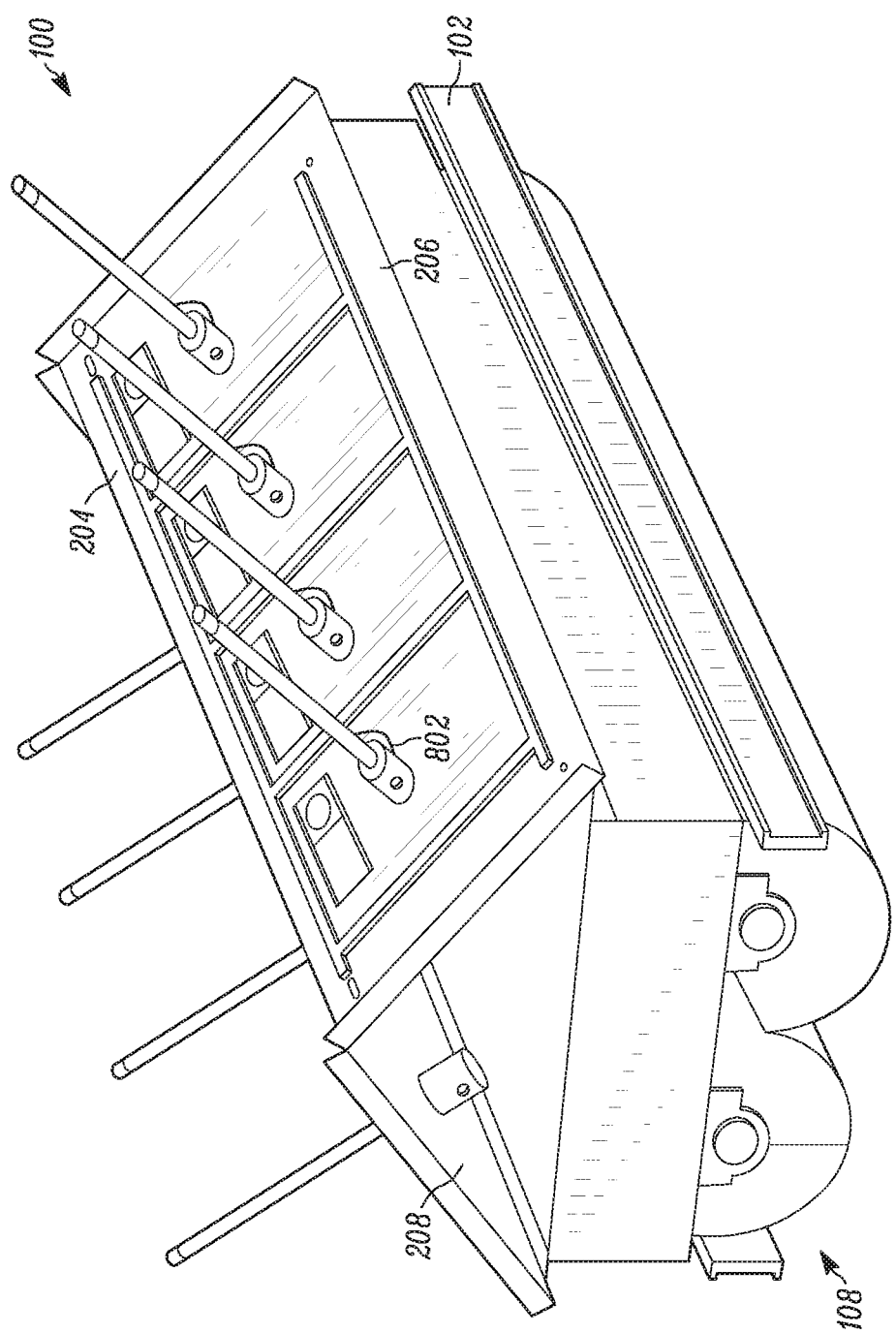
FIG. 8 is an illustration of another embodiment of the soil remediation device on a pug mill in accordance with the present disclosure.

The arrangement and structure of burner tube 202 and burner 200 impacts the efficiency, reliability and durability of soil remediation unit 100. In one embodiment, as discussed above, burner 200 is supported by adjustment elements positioned around the circumference of burner tube 202. This configuration maintains an air pocket between the outer surface of burner 200 and the inner surface of burner tube 202. In addition, as stated above, the lower edge of burner 200 can sit on a series of fasteners positioned in the series of lower adjustment holes 506, 508. This can, in part, lower the risk of burner 200 from moving or falling into the area below canopy 204. To further reduce this risk, soil remediation unit 100 can also include tethers 802 as shown in FIG. 8. Tether 802 is a length of material that is connected to burner tube 202 and burner 200. Tether 802 can be any suitable length of material such as chain, metal cable or the like. In a situation wherein the adjustment elements that support burner 200 fail, tether 802 prevents burner 200 from falling into the area under the canopy 204 where the burner could be damaged from the increased heat or the rotating components of pug mill 102.

As can be seen in FIGS. 1, 2 and 8, soil remediation device 100 includes one or more pairs of burners 200 and burner tube 202. In the embodiment shown, four sets of burners 200 and burner tubes 202 may be included on each of the first panel 206 and the second panel 209 of canopy 204. The four sets of burners 200 and burner tubes 202 can be placed in a linear relationship and at a desired position along the first panel 206 and the second panel 208. Other configurations, however, can also be used. For example, in another embodiment, the arrangement of burner tubes 202 and burners 200 is staggered. In this configuration each neighboring burner tube is located at a different position along first panel 206 and second panel 208. The staggering of burner tubes 202 and burners 200 can assist in distributing the heat produced from burners 200 to the contaminated soil. Still further, in another embodiment, the configuration of burner tubes 202 along first panel 206 and second panel 208 can follow other paths such as arcs, wave-patterns, or the like. In addition, the number of burner tubes along first panel 206 and second panel 208 can be increased or decreased.

In another embodiment, as shown in FIG. 3, the distribution of burners 200 and burner tubes 202 on first panel 206 versus second 208 can be offset. As shown in FIG. 3, openings 300 in which burner tubes 202 can be positioned are not centered on first panel 206. In such an embodiment, when two panels are manufactured using the same burner distribution as shown on FIG. 3 and then are subsequently attached together at an upper edge, because openings 300 are not centered on the panel, openings 300 on a first panel 206 and a second panel 208 will be offset from each other along the length of canopy 204. This arrangement can assist with the distribution of heat within soil remediation unit 100. The size of soil remediation unit 100 can also be varied to balance and address varying needs associated with different quantities of contaminated soil, the size of pug mill 102, work site size limitations, and other issues known to one of ordinary skill in the art. As the size of soil remediation unit is varied, so too can the size and quantity of burners 200 and burner tubes 202.

Figure 9:
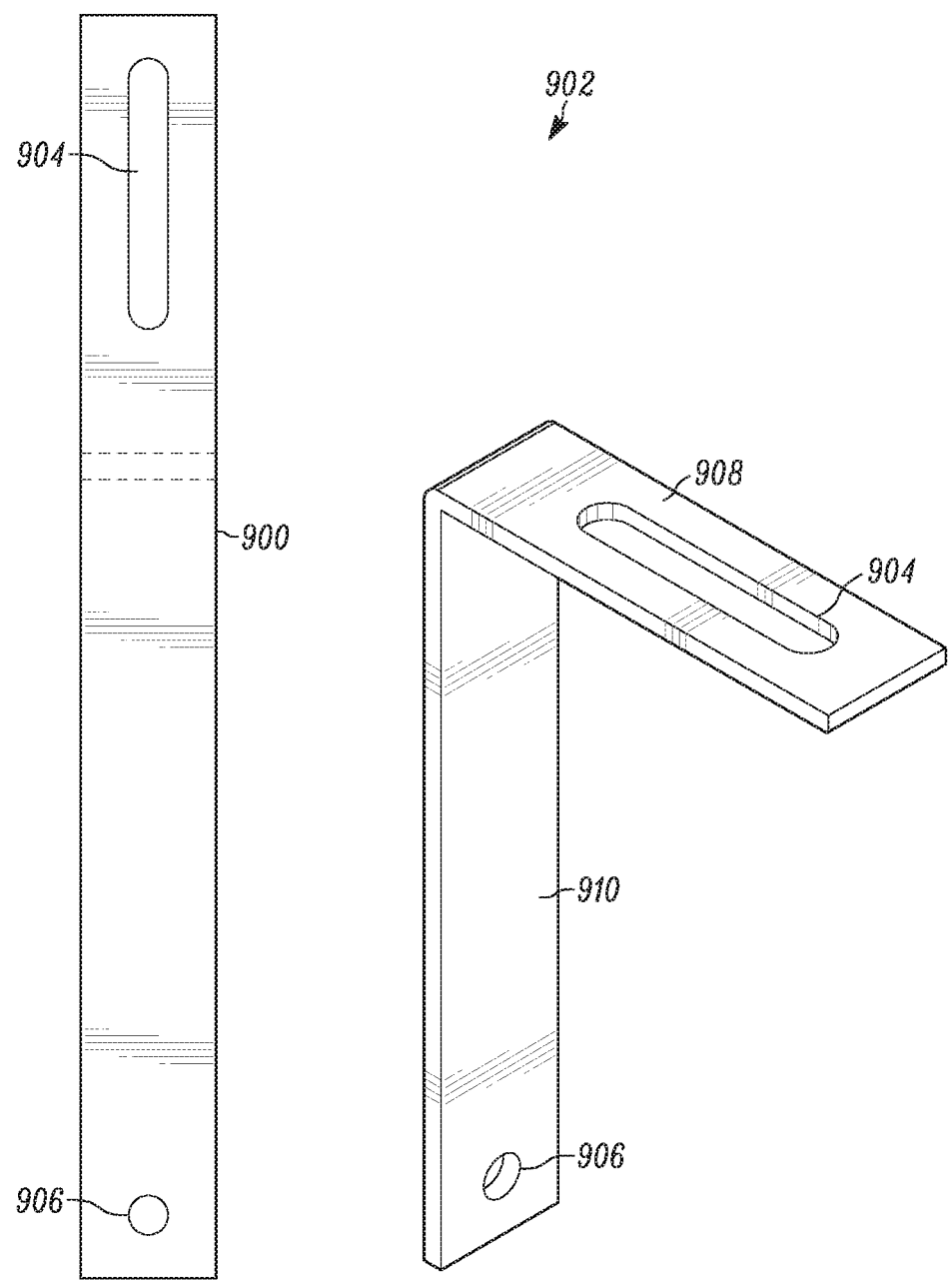
FIG. 9 is an illustration of one embodiment of a security strap in accordance with the present disclosure.

As described above, soil remediation unit 100 can be used in conjunction with a pug mill 102 as shown in FIG. 1. To connect soil remediation unit 100 to pug mill 102, security strap 902 can be used. As shown in FIG. 9, security strap 902 can include a top interface surface 908 with slot 904 and vertical interface surface 910 with connection point 906. Security strap 902 can be attached to canopy 204 to secure canopy 204 to a pug mill 102. Connection point 906 can be used to attach security strap 902 to a member of pug mill 102 and slot 904 can be connected to the first panel 206 or the second panel 208 of canopy 204. A bolt, pin, rivet or other suitable fastener can be used for these connections. In the embodiment shown in FIG. 9, security strap 902 is formed from a single steel blank and is bent into the desired configuration. Other embodiments can also be used such as an adjustable security strap with a hinge connecting the top interface surface to the vertical interface surface.

Figure 11:
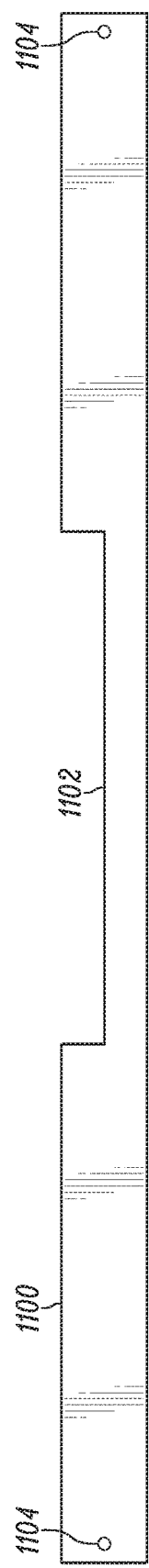
FIG. 11 is a plan view of an embodiment of a dirt dam in accordance with the present disclosure.

As shown in FIG. 11, soil remediation unit 100 can also include dirt dam 1100. Dirt dam is a substantially planar piece of material with the configuration as shown in FIG. 11. Dirt dam 1100 can include notch 1102 and fastener points 1104. In operation without dirt dam 1100 fixed to pug mill 102, soil can exit pug mill 102 upon reaching exit outlet 108. Alternatively, dirt dam 1100 can be fixed to the end of pug mill 102. On a pug mill with dirt dam 1100 in place, soil is limited from exiting pug mill 102 until soil 102 accumulates to a predetermined height such that it can empty from pug mill 102 by falling over the top of dirt dam 1100. As can be appreciated, the height of dirt dam 1100 can play a role in the amount of time any given portion of soil remains in pug mill 102. Thus, with a dirt dam in place, increased mixing can take place and each portion of soil will be subjected to decontamination heating. Dirt dam 1100 can be made of various materials and in various configurations according to the size of the pug mill 102 and the desired mixing effects that it may induce. In one embodiment dirt dam 1100 is made of a 0.25 inch steel size to the configuration shown in FIG. 11. Notch 1102 can be approximately 18 inches in length and be centrally located on dirt dam 1100. Connection points 1104 can be used to fix dirt dam 1100 to pug mill 102 and can be 0.4375 inch holes in either end of dirt dam 1100. Alternatively, dirt dam can be fixed to pug mill 102 using brackets, grooves or other suitable retention features.

While the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

The invention claimed is:

1. A soil remediation unit comprising:
   a portable canopy;
   a burner tube attached to the canopy including a plurality of upper securing elements wherein only one of said plurality of upper securing elements is movable, a plurality of lower height adjustment elements and one or more intake openings; and
   a burner supported in a desired position by the plurality of upper securing elements and the plurality of lower height adjustment elements to maintain a concentric air gap between the burner and the burner tube, wherein the burner can be secured or released from the desired position by moving only the one movable upper securing element and further wherein the plurality of lower height adjustment elements extend radially inward into the burner tube such that an annular surface of the burner rests on the plurality of lower height adjustment elements thus preventing downward movement of the burner.

2. The soil remediation unit of claim 1 wherein the canopy includes at least one vapor exhaust mechanism comprising a hatch and a port, the hatch movably connected to the canopy and configured to operate in an open position and a closed position such that when the hatch is in the open position, the movement of vapor from one side of the canopy to the other side of the canopy is permitted through the port.

3. The soil remediation unit of claim 1 wherein the burner tube is a cylindrical tube inside of which the burner is positioned.

4. The soil remediation unit of claim 1 wherein the canopy comprises a first panel connected to a second panel, the first panel and the second panel each including at least one opening configured to receive the burner tube.

5. The soil remediation unit of claim 1 wherein the canopy comprises a first panel connected to a second panel along a longitudinal edge, the first panel comprising one or more reinforcement elements positioned on the first panel parallel to the longitudinal edge.

6. The soil remediation unit of claim 1 wherein the burner tube is cylindrical in shape and is mounted to a first panel of the canopy such that a central axis of the burner tube is substantially perpendicular to the first panel.

7. The soil remediation unit of claim 6 wherein the burner is cylindrical in shape and is positioned concentrically inside the burner tube, the plurality of upper securing elements positioned 60 degrees out of phase with the plurality of lower height adjustment elements and the plurality of lower height adjustment elements contacting the burner and permitting the burner to be secured at a desired location along the central axis relative to the first panel.

8. A burner assembly for use on a soil remediation unit comprising:
   a burner tube including a plurality of upper securing elements wherein only one of said plurality of upper securing elements is movable and at least one lower height adjustment element radially fixed relative to the burner tube and an intake opening; and
   a burner movably secured relative to the burner tube to maintain an air gap by the plurality of upper securing elements and the at least one lower height adjustment element, wherein the burner can be secured or released relative to the burner tube by moving only the one movable upper securing element and further wherein the lower height adjustment element extends radially inward into the burner tube such that the burner is prevented from moving past the fixed lower height adjustment.

9. The burner assembly of claim 8 wherein the burner tube includes a first set of lower adjustment holes and a second set of lower adjustment holes, the first set and second set of lower adjustment holes positioned at different vertical heights along the burner tube such that the burner can be positioned at different heights by the at least one lower height adjustment elements that are inserted through the lower adjustment holes.

10. The burner assembly of claim 8 wherein the burner tube further comprises one or more upper securing holes through which the plurality of upper securing elements can be installed to support the burner.

11. The burner assembly of claim 8 wherein at least one of the plurality of upper securing elements is secured in position relative to the burner tube.

12. The burner assembly of claim 8 wherein the burner is cylindrical in shape and includes a bottom annular surface, the bottom annular surface resting on an outer surface of the at least one lower height adjustment element such that the burner is prevented from falling through the burner tube.

13. A method of removing contaminants from soil comprising:
   securing a soil remediation unit to a pug mill, wherein the soil remediation unit comprises a canopy and a burner tube attached to and extending into the canopy, the burner tube including a plurality of upper securing elements wherein only one of said plurality of upper securing elements is movable, a plurality of lower height adjustment elements and one or more intake openings;

securing a burner inside the burner tube with an equal concentric air gap there between at a desired height location relative to the canopy by moving only the one movable upper securing element;

moving soil through the pug mill and under the soil remediation unit such that the soil is heated by the burners to remove contaminants from the soil.

14. The method of claim 13 wherein the burner tube is a cylindrical tube inside of which the burner is positioned.

15. The method of claim 13 wherein the canopy comprises a first panel connected to a second panel, the first panel and the second panel each including at least one opening configured with a burner tube configured to receive the burner.

16. The method of claim 13 wherein the canopy comprises a first panel connected to a second panel along a longitudinal edge, the first panel comprising one or more reinforcement elements positioned on the first panel parallel to the longitudinal edge.

17. The method of claim 13 wherein the burner tube is cylindrical in shape and is mounted to a first panel of the canopy such that a central axis of the burner tube is substantially perpendicular to the first panel.

18. The method of claim 17 wherein the burner is cylindrical in shape and is positioned concentrically inside the burner tube, the at least three upper securing elements and the lower adjustment element contacting the burner and permitting the burner to be secured at a desired location along the central axis relative to the first panel.

19. The method of claim 13 wherein the burner is cylindrical in shape and includes a bottom annular surface, the bottom annular surface resting on an outer surface of the lower adjustment element such that the burner is prevented from falling through the burner tube.

\* \* \* \* \*